No. 720,758. PATENTED FEB. 17, 1903.
W. W. TUCK & A. WASSMANN.
HAND LEVER LOCKING DEVICE.
APPLICATION FILED FEB. 28, 1902.
NO MODEL.
Fig. 1.
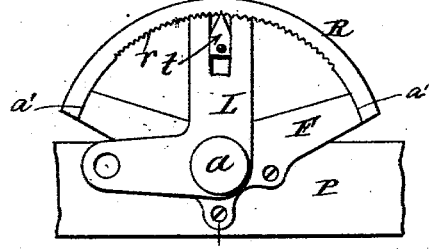
Fig. 2.
Fig. 3.
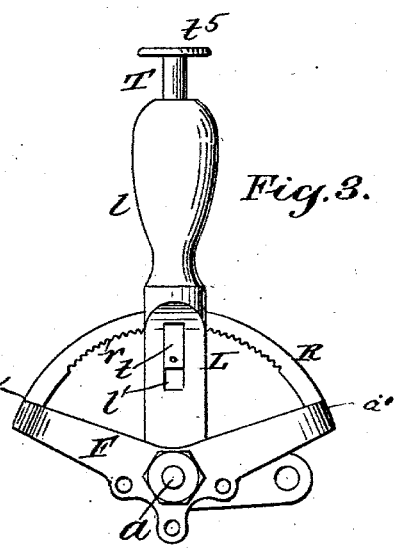
Witnesses.
Inventors:
William W. Tuck
August Wassmann
By their Attorney

UNITED STATES PATENT OFFICE.

WILLIAM W. TUCK, OF RICHMOND HILL, AND AUGUST WASSMANN, OF ASTORIA, NEW YORK, ASSIGNORS TO ABBOT AUGUSTUS LOW, OF HORSESHOE, NEW YORK.

HAND-LEVER-LOCKING DEVICE.

SPECIFICATION forming part of Letters Patent No. 720,758, dated February 17, 1903.

Application filed February 28, 1902. Serial No. 96,045. (No model.)

*To all whom it may concern:*

Be it known that we, WILLIAM W. TUCK, residing at Richmond Hill, and AUGUST WASSMANN, residing at Halletts Point, Astoria, Queens county, State of New York, citizens of the United States, have invented certain new and useful Improvements in Hand-Lever-Locking Devices, of which the following is a specification sufficient to enable others skilled in the art to which the invention appertains to make and use the same.

Our improvements relate to hand-lever-locking devices in which a spring-pawl engages with teeth formed upon a segmental rack.

We simplify the arrangement of parts, attain a neat and compact structure, and insure the positive locking of the parts by means of our invention, which consists, essentially, in the use of a concave series of segmental teeth in conjunction with a spring-pawl, the stem of which extends through the handle of the lever, so that it may be manipulated to unlock the parts by the pressure of the thumb of the hand applied to the lever, as hereinafter more fully described and claimed specifically.

In the accompanying drawings, Figure 1 is an elevation of our improved device; Fig. 2, a section upon plane of line 2 2, Fig. 1; Fig. 3, a rear view.

We have herein shown our invention as applied to a bell-crank lever, although it is obvious that the principle may be applied to other forms of levers.

The bell-crank lever L is pivotally connected at $a$ to the frame F, attached to a stationary part P. The frame rack-bar R upon the inner concave surface is formed with the rack-teeth $r$. This frame is offset at its ends, as seen at $a'$, and the rack-bar portion R is out of vertical alinement with the portion of the frame which is attached to the stationary support P, as is clearly seen in Fig. 2. The offsets form stops to limit the movement of the lever, and the latter is recessed upon its rear face, as seen in Fig. 2, to receive the rack-bar. The pawl is connected with the stem in vertical alinement with the lower portion of the lever, and the portion which engages with the teeth of the rack-bar is out of alinement with said stem, as is clearly seen in Fig. 2. This forms a most efficient, strong, and reliable locking device by which the parts are guided in their proper movements and in which all liability of injury is prevented.

The pawl-tooth $t$ is attached to the lower end of the rod or stem T, which passes upward through the handle $l$ of the lever L, said lever-handle being formed with the axial tubular passages $t'$ and $t^2$, the latter and upper one of the two being the larger to accommodate the spiral spring $b$, which is interposed between the shoulder $t^3$ on the head $t^4$ of the rod T and the shoulder $l^4$ between the tubular passages $t'$ and $t^2$. The body of the lever is formed with the slot $l'$ below the handle $l$ to admit of the depression of the rod T to release the pawl $t$, and its head $t^4$ is formed with a thumb plate or bearing $t^5$.

It will be seen that the handle $l$ is free and unobstructed, so that it may be conveniently and firmly grasped in the palm of the hand, leaving the thumb free to manipulate the pawl-rod; also, that the operative parts are isolated and protected from accidental contact with or displacement by extraneous objects. Furthermore, owing to the concave arrangement of the ratchet-teeth, the resistance to accidental displacement is greatly increased, and the locking of the parts is rendered practically positive.

What we claim as our invention, and desire to secure by Letters Patent, is—

The combination with the frame having lateral offset at each end near its mid-height and an arched portion connecting the opposite end of said offset portions and disposed in a plane parallel with but out of alinement with the body portion of said frame, said arched portion being notched upon its under face, of a bell-crank lever pivotally mounted in the attaching portion of said frame and disposed intermediate the body portion and arched portion of said frame and movable between the said offsets, said lever having a handle portion and an intermediate longitudinal slot and an offset in alinement with the said arched portion, a vertically-disposed rod mounted to reciprocate in said handle, a spring within said handle to act on said lever, and a pawl mounted to reciprocate in said slot and rigidly connected with said handle and having a portion extended out of the plane of the lever to engage the teeth on the under face of the rack, all substantially as herein shown and described.

WILLIAM W. TUCK.
AUGUST WASSMANN.

Witnesses:
D. W. GARDNER,
F. E. ROACH.